Oct. 28, 1969    W. GULDENFELS ET AL    3,475,532
PROCESS FOR THE PRODUCTION OF FIBER-REINFORCED TUBES
OF SYNTHETIC RESIN
Filed Aug. 22, 1966
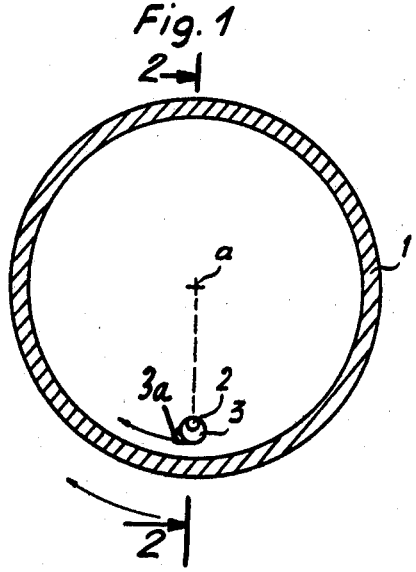
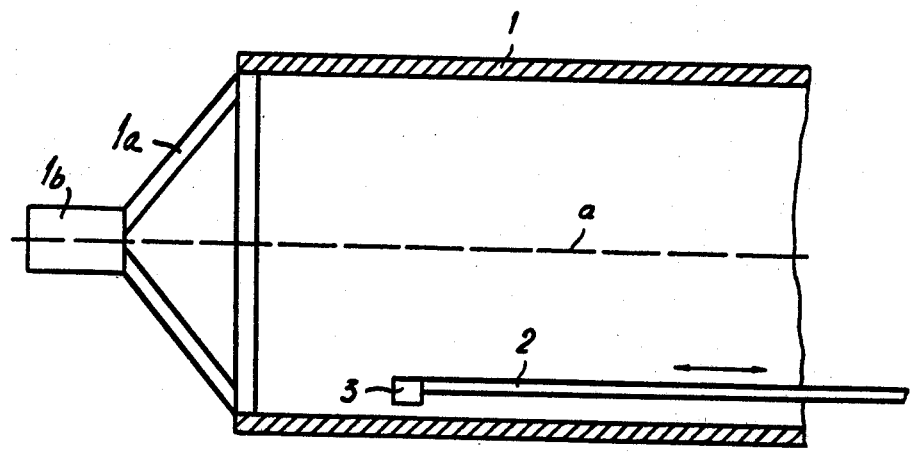
INVENTORS
WILLY GULDENFELS
RUDOLF HOENGER
BY
ATTORNEYS United States Patent Office 3,475,532
Patented Oct. 28, 1969

3,475,532
PROCESS FOR THE PRODUCTION OF FIBER-REINFORCED TUBES OF SYNTHETIC RESIN
Willy Guldenfels, Neu-Allschwil, and Rudolf Hoenger, Basel, Switzerland, assignors to Basler Stueckfaerberei A.G., Basel, Switzerland
Filed Aug. 22, 1966, Ser. No. 574,134
Claims priority, application Switzerland, Aug. 31, 1965, 12,209/65
Int. Cl. B29c 5/04; B29d 23/00
U.S. Cl. 264—310                    2 Claims

ABSTRACT OF THE DISCLOSURE

A process for producing fiber-reinforced tubes using a rotating mold comprises directing a plastic material in a moldable state into the rotating mold to form a wall portion of plastic material against the interior wall of the mold, and thereafter directing reinforcing fibers onto the plastic material in a manner such that they arrive at the surface of the mold with a velocity speed and direction at which the fibers are deposited onto the plastic material substantially uninfluenced by the rotation of the mold.

---

This invention relates, in general, to a process for producing tubes, and in particular, to a new and useful process for the formation of fiber-reinforced tubes of thermosetting plastic material and to the use of an apparatus for carrying out this process.

In order to add crude fibers to a thermosetting plastic for producing fiber-reinforced tubes, fibers, for example glass fibers, are usually applied by a distributor head movable back and forth coaxially in the tube mold. The fibers are applied in directions approximately radially toward the inner wall of the mold and into the liquid plastic which is simultaneously applied to the mold wall. By a suitable mutual adaptation of the mold speed and the reciprocating movement of the distributor head, it is possible to obtain a somewhat uniform coating of the material with the crude fibers which form a continuous cylindrical reinforcement of the plastic tube produced. A disadvantage in such a process, however, is that the fibers which are directed outwardly from the distributor head are received in the plastic without any particular order or formation. Since the position of the fibers with respect to the wall of the tube to be produced will determine the strength thereof, such a known process does not provide the means for controlling the fibers so that they will be oriented in the most advantageous manner depending on the use of the tube. It has been found that the undesired irregular deposition of the fibers in the plastic wall is mainly the result of the difference in speed between the rotating the tube wall and the impinging fibers and because the fibers are applied approximately perpendicularly to the plastic material which forms the tube wall.

In accordance with the invention, the fibers are applied to the plastic material delivered to the inner wall of the mold along a line spaced outwardly from the axis of the mold and at a speed at least approximately comparable to the direction and magnitude of the circumferential speed of the mold. The single fibers are fed out of the distributor head substantially codirectionally and they are directed in a manner such as that they are oriented circumferentially with the form mold or at a selected oblique angle in accordance with the mold wall strength conditions which are desired. The speed at which the fibers are applied is such that they are substantially uninfluenced by the rotation of the mold as they are applied onto the plastic. For this purpose, the invention includes an apparatus which comprises an arm which is movable axially along the interior of the mold and is mounted for such movement at one end of the mold. The arm is advantageously arranged so that it will apply the fibers closely adjacent the plastic material which is being formed into the mold wall and at a spaced location from the mold axis. The fibers are advantageously imparted with a speed and a direction such that they will be directed onto the wall as it is formed at an angle of between 0 and 90° to the mold axis. Variations in the angle of orientation of the fibers may be made at will in order to provide the desired wall strength characteristic. The apparatus includes a fiber distributing head which is movable back and forth along a line parallel to the mold axis but at a location close to the wall being formed and spaced outwardly from the axis.

Accordingly, it is an object of the invention to provide an improved method of forming a pipe or other tubular element with reinforced fiber materials comprising directing the fibers onto a hardenable material in its fluid state from the interior of a centrifugal mold at a selected angle and at a speed at least approximately comparable in direction and magnitude to the circumferential speed of the mold.

A further object of the invention is to use an apparatus for forming tubular conduits which includes means for directing fibers into a plastic material which is being formed into a tube as it is rotated in a centrifugal mold.

A further object of the invention is to use a device for forming fiber-reinforced tubular elements which is simple in design, rugged in construction and economical to manufacture.

The various feaures of novelty which characterize the invention are pointed out with particularity in the claims annexed to and forming a part of this specificaton. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a transverse sectional view through a tube mold with a distributor head constructed in accordance with the invention; and FIG. 2 is a sectional view taken on the line 2—2 of FIG. 1.

Referring to the drawings in particular, the invention embodied therein comprises a pipe molding apparatus which includes a cylindrical mold 1 having a closed end 1a with a hub portion or shaft portion 1b for rotatably mounting the mold. An arm 2 is mounted for movement backwardly and forwardly in the direction of the arrow by mounting means (not shown). At the outer end of the arm 2 which moves backwardly and forwardly in the mold cavity 1, there is provided a distributor head 3 for distributing fiber material onto the surface of a plastic material which is to be formed into the tubular element within the mold 1 as the latter is rotated.

In accordance with the invention, the distributor head 2 may be designed for the delivery of the liquid plastic material as well as the fiber material, or in some instances it is preferable to deliver the plastic material into the interior of the mold 1 through a tiltable trough (not shown).

A feature of the invention is that the distributor head 3 at the end of the arm 2 is oriented at a spaced location from the axis a toward the interior periphery of the plastic material which is to be formed into the mold within the mold cavity 1. The crude fiber is delivered to the distributor head through the arm 2 in the form of a continuous filament which is cut off within the head (by means not shown) into selected fiber lengths just before it is delivered out through the discharge of the distributor head 3 to the inner wall of the plastic material which is being formed into the tube within the mold 1. In the arrangement illustrated it is preferable that the distributor head 3 be closer to the wall being formed than to the axis $a$ of the mold 1. In addition, the fiber delivery from the distributor head 3 is approximately tangential to the inner wall of the mold and will be at a speed which is comparable to the speed of rotation of the mold wall. The fibers are directed against the plastic material so that the fibers become aligned with the circumferential wall direction and remain fixed in this position during the hardening of the plastic.

In some instances, however, it is possible to embed the fibers in the plastic by first orienting them at selected transverse angles up to 90° from the tubular axis in order to get tensile, compression and bending strength variations of the tube as desired. In order to accomplish this, means are provided in the distributor head for deflecting or imparting a twist to the fibers when they leave the head. Such means may comprise, for example, an auxiliary air jet element 3a for imparting the desired fiber directional orientation as they are directed into the plastic material. Instead of air jets, mechanical deflecting means may of course be advantageously employed.

While a particular embodiment of the invention has been shown and described in detail to illustrate the application of the inventive principles, it will be understood that the invention may be embodied otherwise without departing from such principles.

What is claimed is:

1. A process for producing fiber-reinforced tubes using a rotating mold, comprising directing a plastic material in a moldable state into the rotating mold to form a wall portion of plastic material against the interior wall of the mold, and directing reinforcing fibers into the plastic material all from a location spaced from the axis of rotation of said mold and directly adjacent said plastic material in the direction of rotation of said mold and approximately tangential to and at a speed comparable to the circumferential speed of said mold and at which the fibers are deposited onto the plastic material substantially uninfluenced by the rotation of the mold.

2. A process according to claim 1, wherein said fibers are delivered at a location closer to the inner wall of said mold than to the axis of said mold.

References Cited
UNITED STATES PATENTS

| | | | |
|---|---|---|---|
| 2,870,054 | 1/1959 | Amos | 264—311 |
| 2,902,720 | 9/1959 | Lachiche | 264—108 |
| 2,993,235 | 7/1961 | Brown. | |
| 3,150,219 | 9/1964 | Schmidt | 264—311 X |

ROBERT F. WHITE, Primary Examiner

S. I. LANDSMAN, Assistant Examiner